(12) United States Patent
Cheng et al.

(10) Patent No.: US 9,976,737 B2
(45) Date of Patent: May 22, 2018

(54) COMPUTER CASE

(71) Applicant: ALSON TECHNOLOGY LIMITED, Kowloon (HK)

(72) Inventors: Han-Hung Cheng, Zhubei (TW); Chi-Fen Kuo, Zhubei (TW)

(73) Assignee: ALSON TECHNOLOGY LIMITED, Kowloon (HK)

( * ) Notice: Subject to any disclaimer, the term of this patent is extended or adjusted under 35 U.S.C. 154(b) by 29 days.

(21) Appl. No.: 15/333,651

(22) Filed: Oct. 25, 2016

(65) Prior Publication Data
US 2018/0112865 A1    Apr. 26, 2018

(51) Int. Cl.
*H02K 5/00* (2006.01)
*F21V 33/00* (2006.01)
*G06F 1/18* (2006.01)
*F21V 23/06* (2006.01)
*F21V 23/02* (2006.01)
*F21V 15/01* (2006.01)

(52) U.S. Cl.
CPC .......... *F21V 33/0052* (2013.01); *F21V 15/01* (2013.01); *F21V 23/02* (2013.01); *F21V 23/06* (2013.01); *G06F 1/182* (2013.01); *G06F 1/183* (2013.01)

(58) Field of Classification Search
CPC ...... H05B 37/029; H05K 5/00; H05K 5/0204; G06F 1/181; G06F 1/182; G06F 1/183; F21V 33/0052; F21V 23/02; F21V 23/06; F21V 15/01
See application file for complete search history.

(56) References Cited

U.S. PATENT DOCUMENTS

| 7,517,111 | B2 * | 4/2009 | Tsai | G06F 1/182 362/249.01 |
| 9,464,797 | B1 * | 10/2016 | Hou | F21V 23/007 |
| 9,820,366 | B2 * | 11/2017 | Kuo | H05B 41/2828 |
| 2005/0146869 | A1 * | 7/2005 | Lee | F21V 33/0052 362/227 |
| 2006/0061983 | A1 * | 3/2006 | Chen | F21V 33/0052 362/84 |

FOREIGN PATENT DOCUMENTS

TW    M522388    5/2016

* cited by examiner

*Primary Examiner* — Peggy Neils
(74) *Attorney, Agent, or Firm* — Muncy, Geissler, Olds & Lowe, P.C.

(57) ABSTRACT

A computer case is provided, including a housing and a light-emitting module. The housing has a cover and a main body. The cover coveringly is attached to the main body and having a receiving portion. The light-emitting module is attached to the receiving portion and includes a shell, a substrate, a boost circuit and a plasma tube. The shell has a light-penetrable portion, and the boost circuit is disposed on the substrate. The plasma tube has a light-emitting main body and two electrodes. The light-emitting main body at least partly corresponds to the light-penetrable portion.

10 Claims, 7 Drawing Sheets

COMPUTER CASE

BACKGROUND OF THE INVENTION

Field of the Invention

The present invention relates to a computer case.

Description of the Prior Art

As technology progress and life way changes, there are computers everywhere. Components such as motherboard and graphics card are generally installed in the computer case for preventing unexpected collision and malfunction. More important, since electric components are upgraded rapidly, the computer case is generally designed to be detachably assembled easily and conveniently for easy replacement of electric components. This type of computer case is disclosed in TWM522388, for example.

However, this type of computer case is merely provided for receiving electric components but without additional utilities, and thus it already cannot satisfy user's need.

The present invention has arisen to mitigate and/or obviate the afore-described disadvantages.

SUMMARY OF THE INVENTION

The major object of the present invention is to provide a computer case, which can light up in a dark environment so as to avoid unexpected collision, and has high compatibility and portability.

To achieve the above and other objects, a computer case is provided, including: a housing, having a cover and a main body, the cover coveringly attached to the main body and having a receiving portion; a light-emitting module, attached to the receiving portion, including a shell, a substrate, a boost circuit and a plasma tube, the shell having a light-penetrable portion, the boost circuit disposed on the substrate, the boost circuit including at least one conductive line and a plurality of electronic components, the electronic components being electrically connected to the at least one conductive line, the at least one conductive line including a power input portion and two power output portions, the power input portion forming an electric connector, the electric connector being separatably electrically connected to a power source, the plasma tube having a light-emitting main body and two electrodes which are disposed on the light-emitting main body, the light-emitting main body at least partly corresponding to the light-penetrable portion, the two electrodes being respectively electrically connected to the two power output portions.

To achieve the above and other objects, a computer case is further provided, including: a housing, having a cover, a main body and a light-emitting assembly, the cover coveringly attached to the main body and having a receiving portion, the light-emitting assembly having a substrate and a boost circuit, the boost circuit disposed on the substrate, the boost circuit including at least one conductive line and a plurality of electronic components, the electronic components being electrically connected to the at least one conductive line, the at least one conductive line including a power input portion and two power output portions, the power input portion for being separatably electrically connected to a power source, the two power out portions forming an electric transmission portion; a light-emitting module, attached to the receiving portion, including a shell and a plasma tube, the shell having a light-penetrable portion, the plasma tube having a light-emitting main body and two electrodes which are disposed on the light-emitting main body, the light-emitting main body at least partly corresponding to the light-penetrable portion, the two electrodes being electrically connected to an electric connector, the electric connector being separatably electrically connected to the electric transmission portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
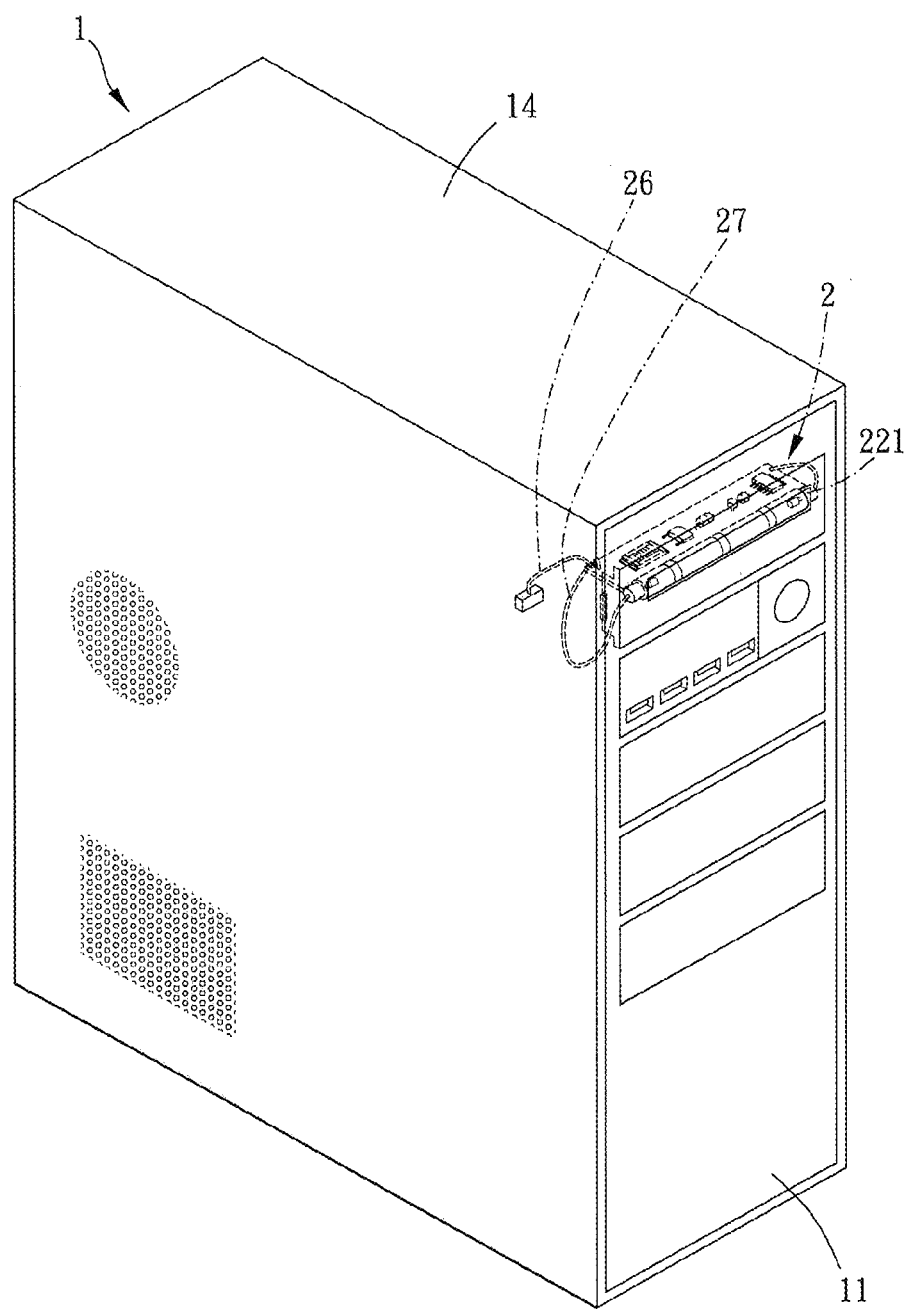
FIG. 1 is a stereogram of a first preferred embodiment of the present invention.
Figure 2:
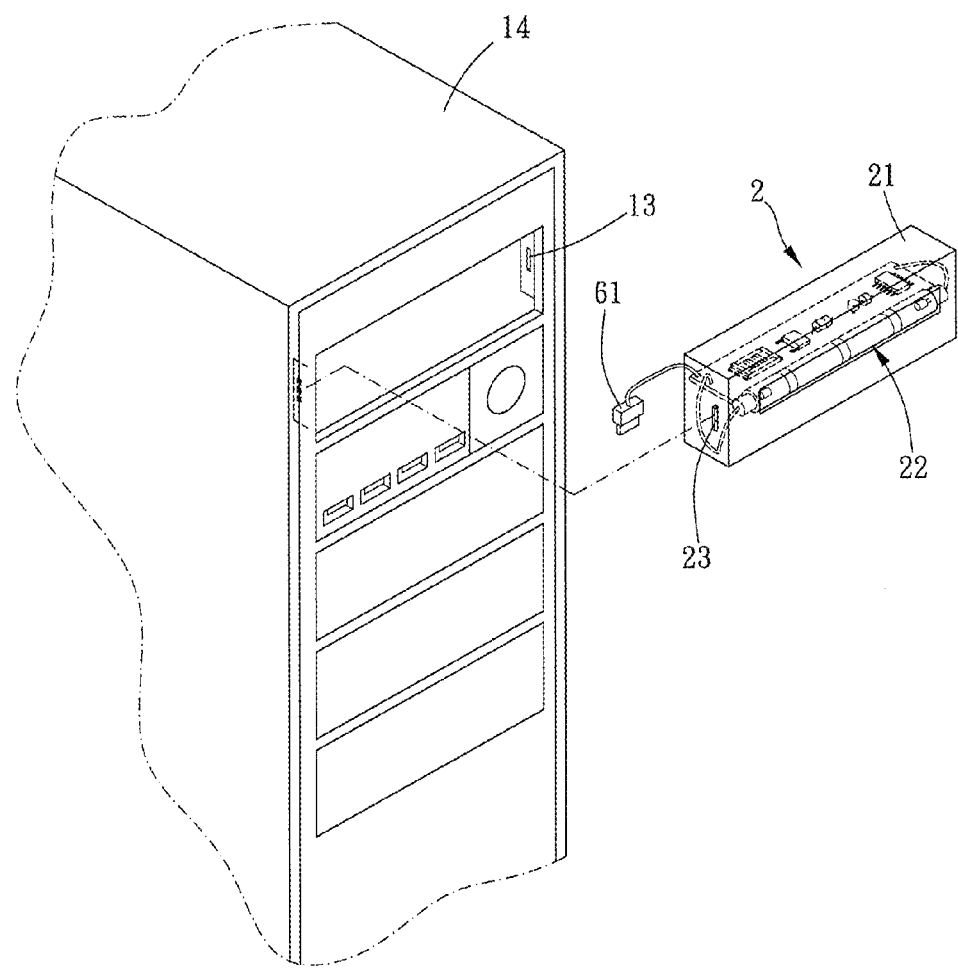
FIG. 2 is a breakdown stereogram of FIG. 1.
Figure 3:
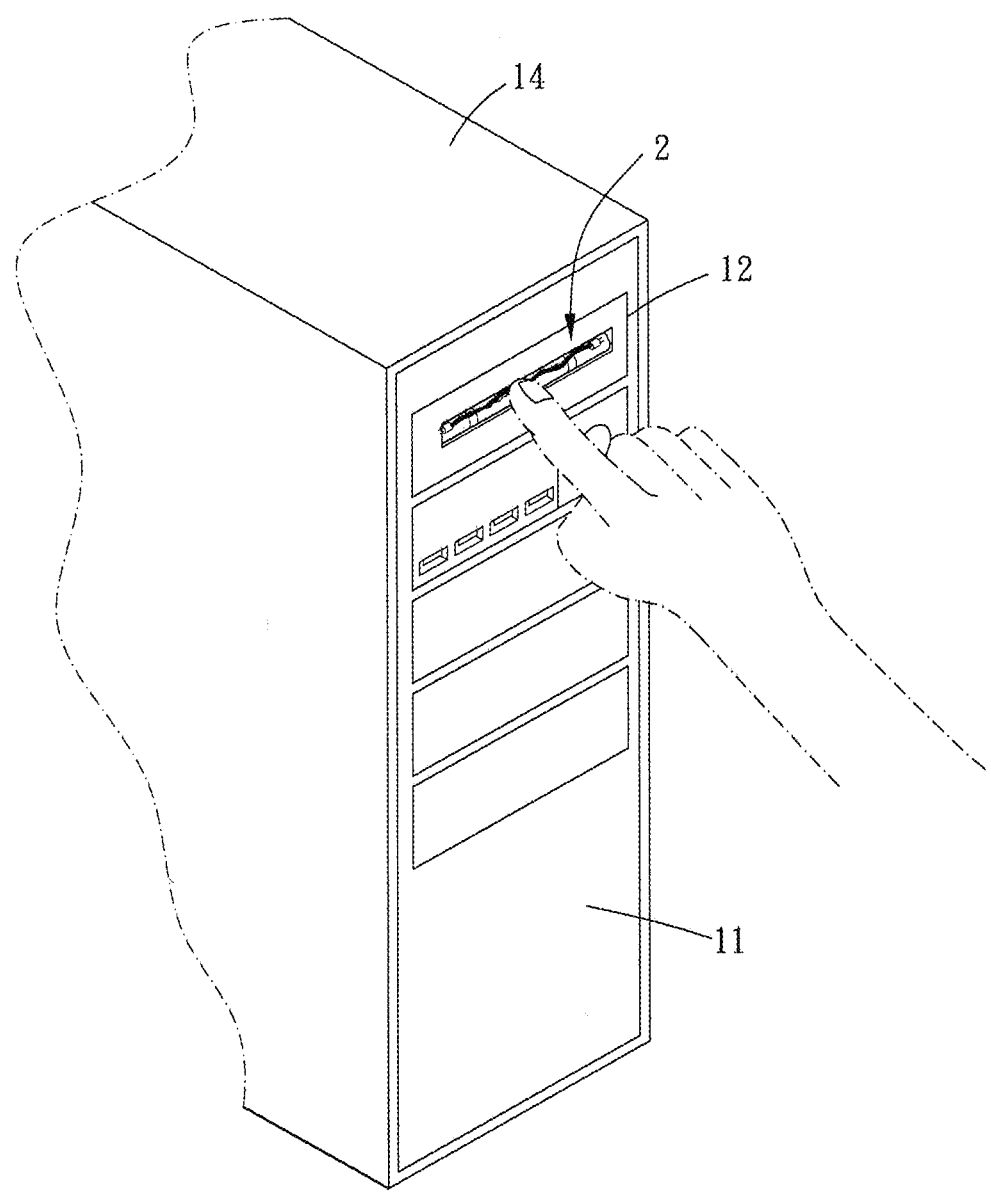
FIG. 3 is a drawing of a first preferred embodiment in use according to the present invention.
Figure 4:
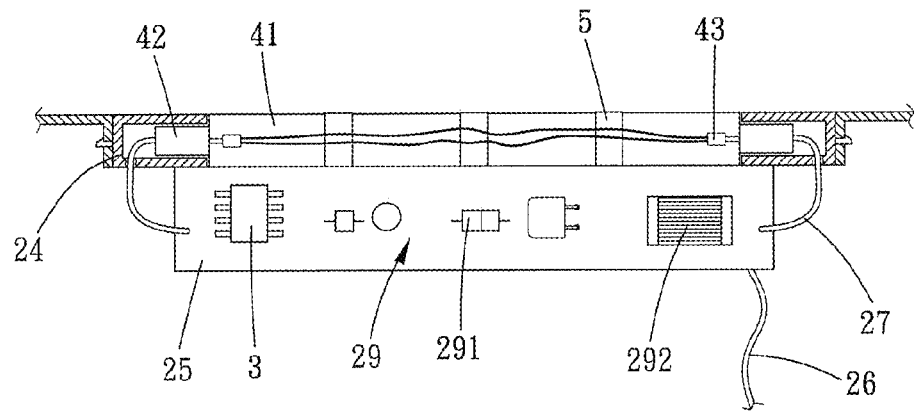
FIGS. 4 and 5 are cross-sectional views of a preferred embodiment of the present invention.
Figure 5:
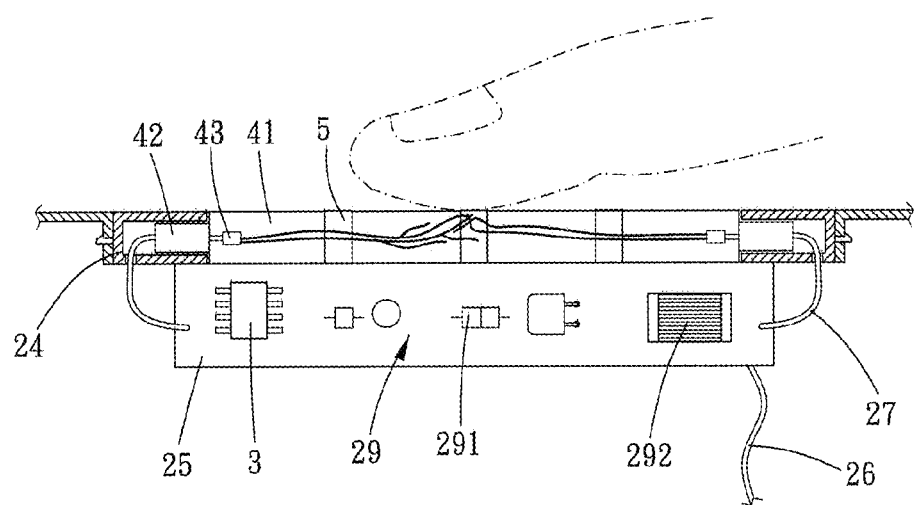
Figure 6:
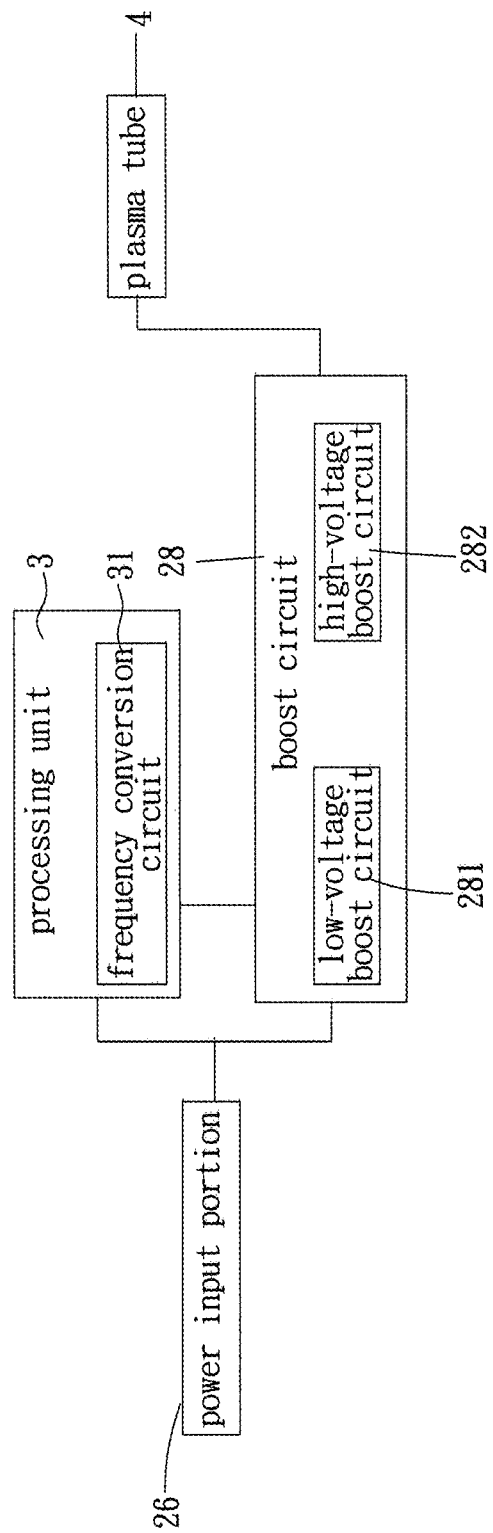
FIG. 6 is a diagram showing a relation of a light-emitting module of a preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for a first embodiment of the present invention. A computer case includes a housing 1 and a light-emitting module 2.

The housing 1 has a cover 11 and a main body 14. The cover 11 is coveringly attached to the main body 14 and has a receiving portion 12. The light-emitting module 2 is attached to the receiving portion 12. The light-emitting module 2 includes a shell 21, a substrate 25, a boost circuit 28 and a plasma tube 4, the shell 21 has a light-penetrable portion 22, the boost circuit 28 is disposed on the substrate 25, the boost circuit 28 includes at least one conductive line and a plurality of electronic components 29, the electronic components 29 are electrically connected to the at least one conductive line, the at least one conductive line includes a power input portion 26 and two power output portions 27, the power input portion 26 forms an electric connector 61, the electric connector 61 is separatably electrically connected to the power source, the plasma tube 4 has a light-emitting main body 41 and two electrodes 42 which are disposed on the light-emitting main body 41, the light-emitting main body 41 at least partly corresponds to the light-penetrable portion 22, and the two electrodes 42 are respectively electrically connected to the two power output portions 27. The two electrodes 42 are disposed on two opposite ends of the light-emitting main body 41, the light-emitting main body 41 and the two electrodes 42 are coaxially arranged, each said electrode 42 includes an electrode cap 43 which is located within the light-emitting main body 41 and is hollow, and the two electrode caps 43 are substantially coaxially arranged.

A light emitted from the light-emitting module 2 can light up for guiding user to find objects in a dark environment quickly and avoiding collision. Preferably, the light-emitting module 2 is detachably attached to the receiving portion 12, so that the housing and the light-emitting module can be replaced individually when malfunctioning and it is eco-friendly and cost-saving. The light-emitting module 2 is compatible with conventional computer cases and portable. Additionally, the light-emitting module 2 can be replaced by another one having different color of light.

Figure 7:
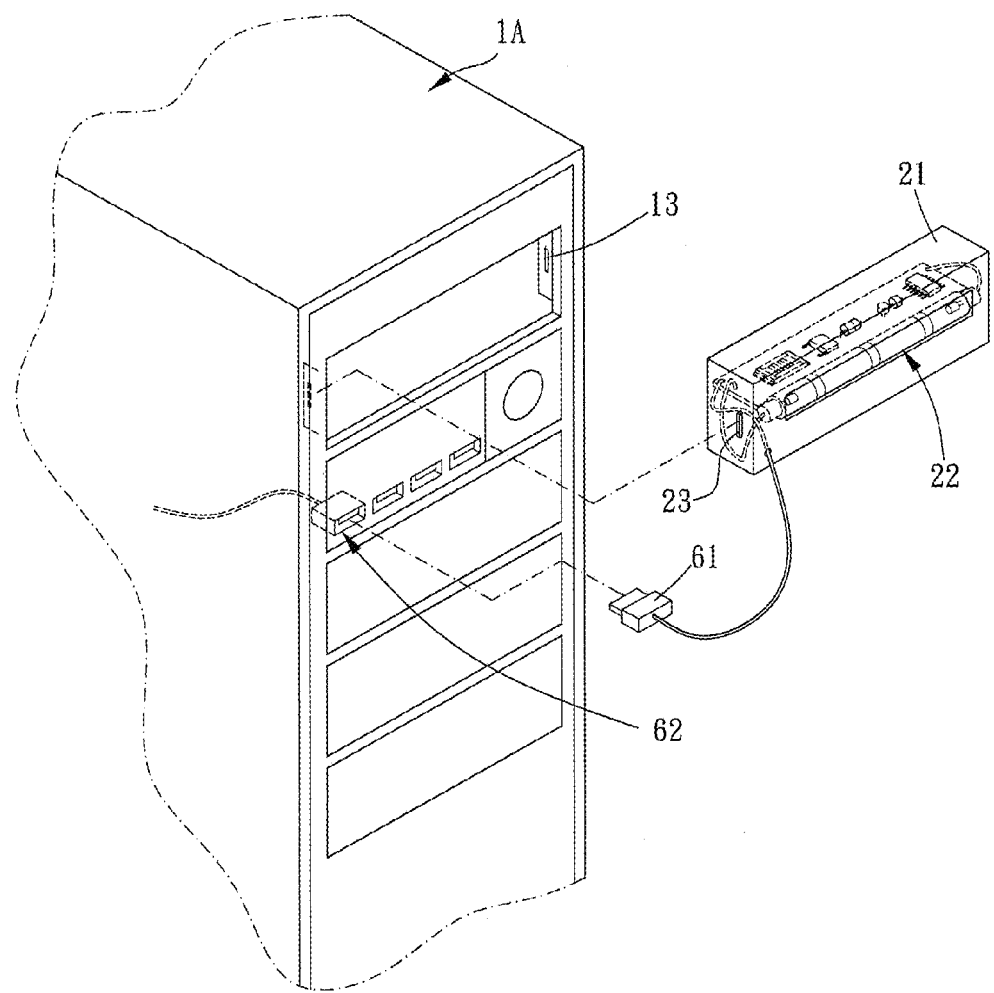
FIG. 7 is a stereogram of another preferred embodiment of the present invention.

It is to be noted that the power source electrically connected with the electric connector 61 may be a power supply installed on the computer case or an external battery out of the computer case. The computer case may include a member for connection of the electric connector 61 thereto. For example, in an alternative embodiment as shown in FIG. 7, a housing 1A includes an electric transmission portion 62, one end of the electric transmission portion 62 is for being electrically connected to the power source, and another end of the electric transmission portion 62 is detachably electrically connected to the electric connector 61. The electric transmission portion 62 and the electric connector 61 are preferably male and female USB interfaces, so that the electric connector 61 can be broadly applied to any computer case having a USB port.

Please refer to FIGS. 1 to 6 again, regarding a circuit structure of the light-emitting module 2, the conductive line is buried in the substrate 25, and the substrate 25 and the conductive lines define a printing circuit board; and of course, the conductive lines may be arranged on the substrate 25 in other ways. The boost circuit 28 transfers a low-voltage direct current which is input by the power input portion 26 to a high-voltage alternating current and supplies the high-voltage alternating current through the two power output portions 27 to the plasma tube 4. The boost circuit 28 may transfer the low-voltage direct current into a light-voltage pulsed direct current.

Specifically, the light-emitting module 2 further includes a processing unit 3 which is disposed on the substrate 25, the processing unit 3 includes a frequency conversion circuit 31 which is electrically connected to the power input portion 26 and the boost circuit 28, the frequency conversion circuit 31 is configured to transfer an input power source which has a first frequency from the power input portion 26 to at least one output power source which has a second frequency and an output power source which has a third frequency, the at least one output power source having the second frequency and the output power source having the third frequency are transmitted to the boost circuit 28 in a preset sequence, the first frequency and the second frequency are different, and the second frequency and the third frequency are different; therefore, the plasma tube 4 produces the light which waves variously based on the power sources having different frequencies input by the boost circuit 28.

The plurality of electronic components 29 include a plurality of passive components 291 and at least one transformer 292, and the plurality of passive components 291 are electrically connected to one another to form a low-voltage boost circuit 281 which is electrically connected to the power input portion 26 and the processing unit 3 so as to boost the power source provided by the circuit substrate 25, for example, from 1.5-3.5V to 12-15V. The at least one transformer 292 forms a high-voltage boost circuit 282 which is electrically connected between the low-voltage boost circuit 281 and the two power output portions 27 so as to transfer a low-voltage power to a high-voltage power, for example, from 12-15V to 700-900V, for the plasma tube 4 to use.

It is to be noted that when a finger of a human body touches the light-emitting main body 41, the light in the light-emitting main body 41 undergoes electronic neutralization (when the human body functions as a grounding wire), and a part of the light is guided to a place that the finger touches so as to produce outstanding light paths. Therefore, in order to retain this characteristic of the plasma tube 4, in the first embodiment, the light-penetrable portion 22 is a through hole 221, the light-emitting main body 41 is exposed from the through hole 221 and non-protrusive beyond the shell 21, and the through hole 221 allows the user to touch the light-emitting main body 41 directly.

With the design that the light-emitting main body 41 does not protrude beyond the shell 21, the light-emitting main body 41 can be effectively prevented from being impacted unexpectedly so as to protect a structural integrity of the light-emitting main body 41. It is to be noted that in an opening direction of the through hole 221, and the shell 21 covers the two electrodes 42 completely so as to prevent the user from touching the electrode 42 and experiencing an electric shock and to block objects from attaching on each said electrode 42, for example, in an axial direction the light-emitting main body 41, the shell 21 abuts against the light-emitting main body 41. It is understandable that in other embodiments, the light-penetrable portion is a cover board which is made of a light-penetrable material, or the whole shell may be made of a transparent material.

Preferably, the light-emitting module 2 further includes at least one protecting member 5, and each said protecting member 5 covers at least a part of the light-emitting main body 41 so as to prevent objects from impacting the light-emitting main body 41 and to absorb or disperse the impact to protect the light-emitting main body 41. Each said protecting member 5 is preferably made of a transparent material so as to provide a preferable light-penetrating effect. More preferably, the shell 21 further has a fixing portion 24 which fixes the plasma tube 4 so as to prevent the plasma tube 4 from moving relative to the shell 21 to prevent collision. Even more preferably, the receiving portion 12 further has a first positioning member 13, the light-emitting module 2 further has a second positioning member 23 which is provided on the shell 21, and the second positioning member 23 and the first positioning member 13 are positionably engaged with each other so as to reinforce an engagement strength of the light-emitting module 2 and the housing 1 to prevent the light-emitting module 2 and the housing 1 from falling off from each other due to unexpected collision.

Figure 8:
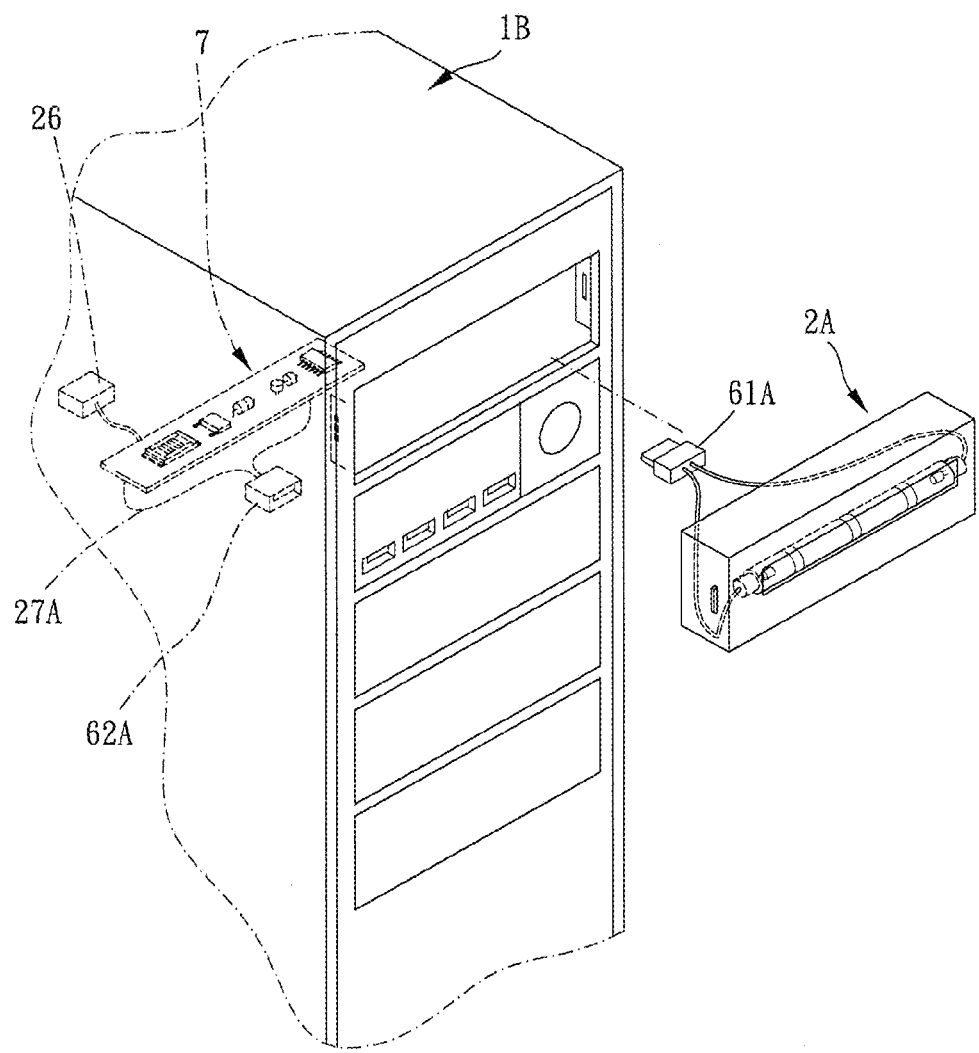
FIG. 8 is a stereogram of another preferred embodiment of the present invention.

Since the substrate 25 and the boost circuit 28 are relatively durable than the plasma tube 4 and require less replacement, the substrate 25 and the boost circuit 28 may be attached to a computer case as shown in FIG. 8, for example. The computer case includes a housing 1B and a light-emitting module 2A. The housing 1B has a cover 11, a main body 14 and a light-emitting assembly 7, and the cover 11 is coveringly attached to the main body 14 and has a receiving portion 12. The light-emitting assembly 7 has a substrate 25 and a boost circuit 28, the boost circuit 28 disposed on the substrate 25, the boost circuit 28 includes at least one conductive line and a plurality of electronic components 29, the electronic components 29 are electrically connected to the at least one conductive line, the at least one conductive line including a power input portion 26 and two power output portions 27A, the power input portion 26 is for being separatably electrically connected to a power source, and the two power out portions 27A form an electric transmission portion 62A.

A light-emitting module 2A is attached to the receiving portion 12, the light-emitting module 2A includes a shell 21 and a plasma tube 4, the shell 21 has a light-penetrable portion 22, the plasma tube 4 has a light-emitting main body 41 and two electrodes 42 which are disposed on the light-emitting main body 41, the light-emitting main body 41 at least partly corresponding to the light-penetrable portion 22, the two electrodes 42 are electrically connected to an electric connector 61A, the electric connector 61A is separatably electrically connected to the electric transmission portion 62A.

Whereby, user can spend less and be willing to purchase the light-emitting module 2A, for getting various outstanding lighting effects. It is understandable that the embodiments mentioned above may cooperate with each other to develop various modes.

Given the above, in the computer case, the light-emitting module can light up in a dark environment so as to avoid unexpected collision. In addition, the light-emitting module is detachable from the housing so that no change of the housing is required. The housing and the light-emitting module can be replaced individually when malfunctioning, and the light-emitting module is portable.

While we have shown and described various embodiments in accordance with the present invention, it should be clear to those skilled in the art that further embodiments may be made without departing from the scope of the present invention.

What is claimed is:

1. A computer case, including:
a housing, having a cover and a main body, the cover coveringly attached to the main body and having a receiving portion;
a light-emitting module, attached to the receiving portion, including a shell, a substrate, a boost circuit and a plasma tube, the shell having a light-penetrable portion, the boost circuit disposed on the substrate, the boost circuit including at least one conductive line and a plurality of electronic components, the electronic components being electrically connected to the at least one conductive line, the at least one conductive line including a power input portion and two power output portions, the power input portion forming an electric connector, the electric connector being separatably electrically connected to a power source, the plasma tube having a light-emitting main body and two electrodes which are disposed on the light-emitting main body, the light-emitting main body at least partly corresponding to the light-penetrable portion, the two electrodes being respectively electrically connected to the two power output portions.

2. The computer case of claim 1, wherein the housing further includes an electric transmission portion, one end of the electric transmission portion is for being electrically connected to the power source, and another end of the electric transmission portion is detachably electrically connected to the electric connector.

3. The computer case of claim 1, wherein the light-emitting module further includes a processing unit which is disposed on the substrate, the processing unit includes a frequency conversion circuit which is electrically connected to the power input portion and the boost circuit, the frequency conversion circuit is configured to transfer an input power source which has a first frequency from the power input portion to at least one output power source which has a second frequency and an output power source which has a third frequency, the at least one output power source having the second frequency and the output power source having the third frequency are transmitted to the boost circuit in a preset sequence, the first frequency and the second frequency are different, and the second frequency and the third frequency are different.

4. The computer case of claim 1, wherein the light-penetrable portion is a through hole, the light-emitting main body is exposed from the through hole and non-protrusive beyond the shell, and in an opening direction of the through hole, the shell covers the two electrodes completely.

5. The computer case of claim 1, wherein the light-emitting module further includes at least one protecting member, and each said protecting member covers at least a part of the light-emitting main body.

6. The computer case of claim 5, wherein the light-emitting module is detachable from the receiving portion; the receiving portion further has a first positioning member, the light-emitting module further has a second positioning member which is provided on the shell, and the second positioning member and the first positioning member are positionably engaged with each other; the shell further has a fixing portion which fixes the plasma tube; the housing further includes an electric transmission portion, one end of the electric transmission portion is for being electrically connected to the power source, and another end of the electric transmission portion is detachably electrically connected to the electric connector; the electric transmission portion and the electric connector are male and female USB interfaces; the light-emitting module further includes a processing unit which is disposed on the substrate, the processing unit includes a frequency conversion circuit which is electrically connected to the power input portion and the boost circuit, the frequency conversion circuit is configured to transfer an input power source which has a first frequency from the power input portion to at least one output power source which has a second frequency and an output power source which has a third frequency, the at least one output power source having the second frequency and the output power source having the third frequency are transmitted to the boost circuit in a preset sequence, the first frequency and the second frequency are different, and the second frequency and the third frequency are different; the light-penetrable portion is a through hole, the light-emitting main body is exposed from the through hole and non-protrusive beyond the shell, and in an opening direction of the through hole, the shell covers the two electrodes completely; in an axial direction of the light-emitting main body, the shell abuts against the light-emitting main body; the plurality of electronic components include a plurality of passive components and at least one transformer, the plurality of passive components are electrically connected to one another to form a low-voltage boost circuit which is electrically connected to the power input portion and the processing unit, the at least one transformer forms a high-voltage boost circuit which is electrically connected between the low-voltage boost circuit and the two power output portions; the two electrodes are disposed on two opposite ends of the light-emitting main body, and the light-emitting main body and the two electrodes are coaxially arranged; each said electrode includes an electrode cap which is located within the light-emitting main body and is hollow, and the two electrode caps are substantially coaxially arranged.

7. A computer case, including:
a housing, having a cover, a main body and a light-emitting assembly, the cover coveringly attached to the main body and having a receiving portion, the light-emitting assembly having a substrate and a boost circuit, the boost circuit disposed on the substrate, the boost circuit including at least one conductive line and a plurality of electronic components, the electronic components being electrically connected to the at least one conductive line, the at least one conductive line including a power input portion and two power output portions, the power input portion for being separatably electrically connected to a power source, the two power out portions forming an electric transmission portion;
a light-emitting module, attached to the receiving portion, including a shell and a plasma tube, the shell having a light-penetrable portion, the plasma tube having a light-emitting main body and two electrodes which are disposed on the light-emitting main body, the light-emitting main body at least partly corresponding to the light-penetrable portion, the two electrodes being electrically connected to an electric connector, the electric connector being separatably electrically connected to the electric transmission portion.

8. The computer case of claim 7, wherein the light-penetrable portion is a through hole, the light-emitting main body is exposed from the through hole and non-protrusive beyond the shell, and in an opening direction of the through hole, the shell covers the two electrodes completely.

9. The computer case of claim 7, wherein the light-emitting module further includes at least one protecting member, and each said protecting member covers at least a part of the light-emitting main body.

10. The computer case of claim 9, wherein the light-emitting module is attached to the receiving portion; the receiving portion further has a first positioning member, the light-emitting module further has a second positioning member which is provided on the shell, and the second positioning member and the first positioning member are positionably engaged with each other; the shell further has a fixing portion which fixes the plasma tube; the electric transmission portion and the electric connector are male and female USB interfaces; the light-emitting module further includes a processing unit which is disposed on the substrate, the processing unit includes a frequency conversion circuit which is electrically connected to the power input portion and the boost circuit, the frequency conversion circuit is configured to transfer an input power source which has a first frequency from the power input portion to at least one output power source which has a second frequency and an output power source which has a third frequency, the at least one output power source having the second frequency and the output power source having the third frequency are transmitted to the boost circuit in a preset sequence, the first frequency and the second frequency are different, and the second frequency and the third frequency are different; the light-penetrable portion is a through hole, the light-emitting main body is exposed from the through hole and non-protrusive beyond the shell, and in an opening direction of the through hole, the shell covers the two electrodes completely; in an axial direction of the light-emitting main body, the shell abuts against the light-emitting main body; the plurality of electronic components include a plurality of passive components and at least one transformer, the plurality of passive components are electrically connected to one another to form a low-voltage boost circuit which is electrically connected to the power input portion and the processing unit, the at least one transformer forms a high-voltage boost circuit which is electrically connected between the low-voltage boost circuit and the two power output ends; the two electrodes are disposed on two opposite ends of the light-emitting main body, and the light-emitting main body and the two electrodes are coaxially arranged; each said electrode includes an electrode cap which is located within the light-emitting main body and is hollow, and the two electrode caps are substantially coaxially arranged.

* * * * *